INVENTOR.
RICHARD L. ZENKER
BY
Wilson and Redrow
ATTORNEYS.

Feb. 21, 1956  R. L. ZENKER  2,735,315
DIFFERENTIAL PEDESTALS HAVING LONGITUDINALLY
ADJUSTABLE ANTISPREAD MEMBER
Filed Aug. 31, 1953  2 Sheets-Sheet 2
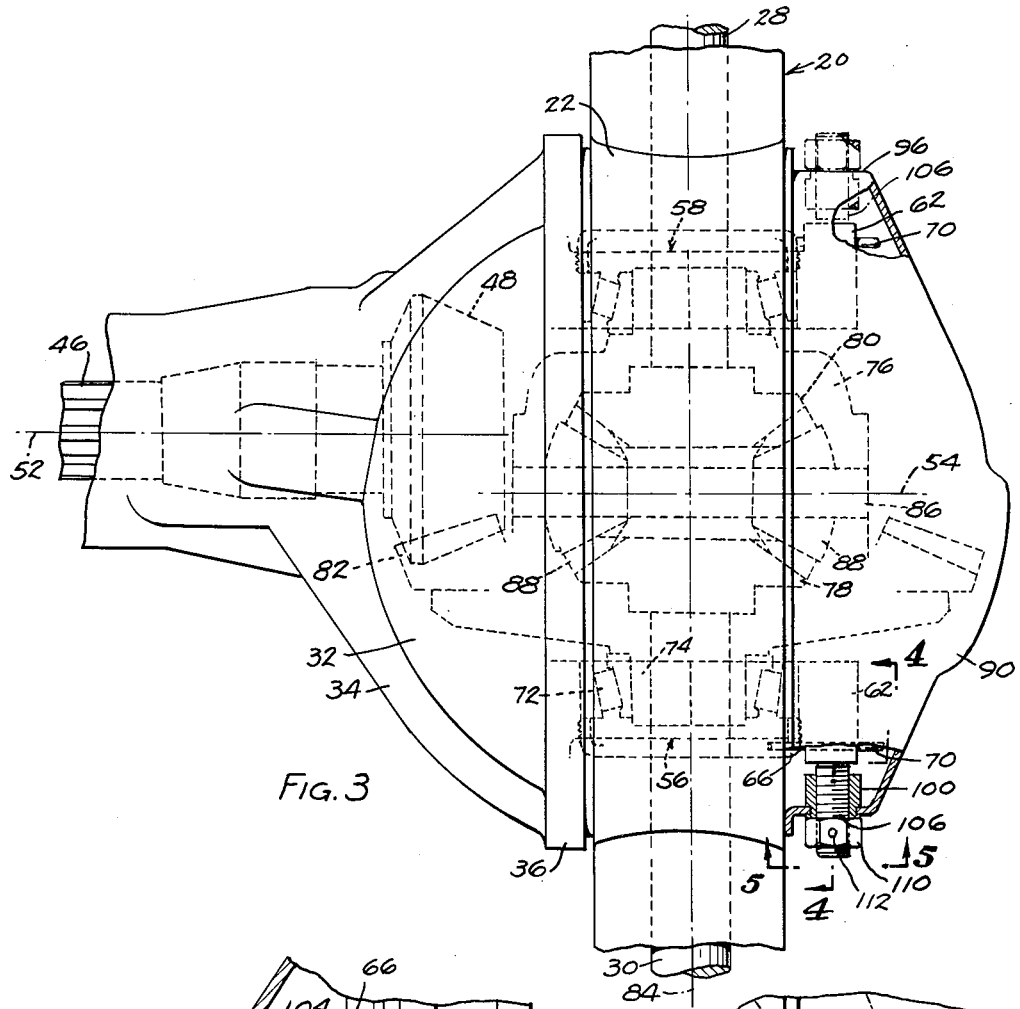
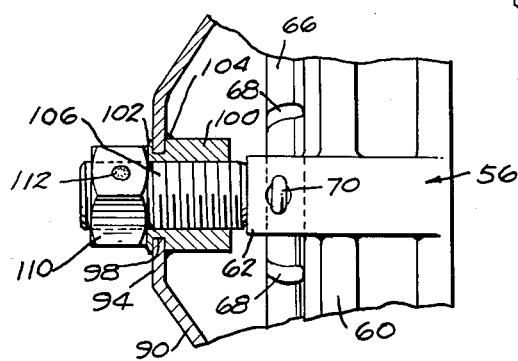
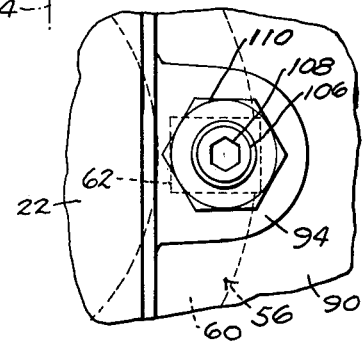
INVENTOR.
RICHARD L. ZENKER
BY
Wilson and Redrow
ATTORNEYS.

United States Patent Office 2,735,315
Patented Feb. 21, 1956

2,735,315

DIFFERENTIAL PEDESTALS HAVING LONGITUDINALLY ADJUSTABLE ANTISPREAD MEMBER

Richard L. Zenker, Grosse Pointe Woods, Mich., assignor to Studebaker-Packard Corporation, a corporation of Michigan Application August 31, 1953, Serial No. 377,396

2 Claims. (Cl. 74—607)

The present application relates chiefly to pedestal-containing rear axle differentials and the like, and particularly to the undesirably spreadable bearing pedestals therein and to axially adjustable anti-spread means therefor which are provided adjacent the bearings for incorporation in the differential.

The ever present move toward higher compression ratios and higher engine power, as illustrated for instance by the current state of the automotive industry, is leading automotive transmission and differential designers and their designs into forms which are preferably more and more rigidized and perhaps internally more bulky but which, where possible, are not increased as to overall external dimensions to a point where the space requirements of other components of the automobile are interfered with. Additional effort is being expended toward re-design in the direction of holding down the extent of elastic flexure of differential parts which though being practicably imperceptible under the loading of moderate power transmitting torques, gives rise to noise and vibration under higher engine output torques. In precision fitted hypoid type differentials for example, only a slight amount of elastic deflection can be tolerated regardless of the instantaneous magnitude of the load and in certain instances of driving in reverse gear the separating forces encountered at the bearing pedestals will amount to approximately 8,000 pounds inside axial thrust.

It is an object of the present invention to provide, in a hypoid type differential having spaced apart overhanging bearing pedestals which are subject to outwardly acting inside loads, an anti-spread means in the form of a positionable reaction member which positively and at all times engages the overhanging bearing pedestal or pedestals to relieve them from having to absorb inside the loads unaided.

Another object of the invention is the provision, in an overhanging pedestal type hypoid gear differential, of a threadably adjustable reaction member engageable with the overhanging portion of the pedestal to take up the side thrust reaction in the latter caused by the axially directed separating thrusts of the hypoid gear, particularly when the gear is run in a reverse direction to its normal direction of rotation.

Another object is the provision of such structure having a reaction member as in the preceding paragraph, wherein the bearing pedestal may be preloaded by the reaction member so as to eliminate therefrom any initial slack or deflection permitting elasticity which would otherwise manifest itself incident to first stages of being loaded. In one physically constructed embodiment of such prestressed reaction member, as installed, the preload corresponded to a set screw setting of from 25 to 35 inch-pounds of torque, resulting in approximately 20 lb. side thrust preload.

An additional object of the invention is to provide a differential carrier having overhanging spaced apart pedestals and further having an external adjustable preloading member to take the reaction from point of pedestal overhanging and which may be utilized and adjusted following final assembly of the carrier and differential and even if necessary, utilized in the field and in service while the assembly remains intact.

Another object in line with the object of the preceding paragraph is to provide a location point for an overhanging pedestal preloading member which is positioned at least as far in an offset position as will correspond to the effective length of the pedestal overhang in order to produce as favorable a leverage moment for resisting the applied dynamic load as is conveniently possible.

Another object of the invention is to produce a hypoid-gear-containing differential case which is rotatably mounted in spaced apart overhanging bearing pedestals and which has a positionable reaction member adjustable toward and away from the planes of the pedestals and hypoid gear in order to be adjustable in the direction of axial thrust which must be encountered.

Further features, objects and advantages will either be specifically pointed out or become apparent when for a better understanding of the invention reference is made to the following written description taken in conjunction with the accompanying drawings in which:

Figure 3 is a plan view of the differential, and

Figure 1:
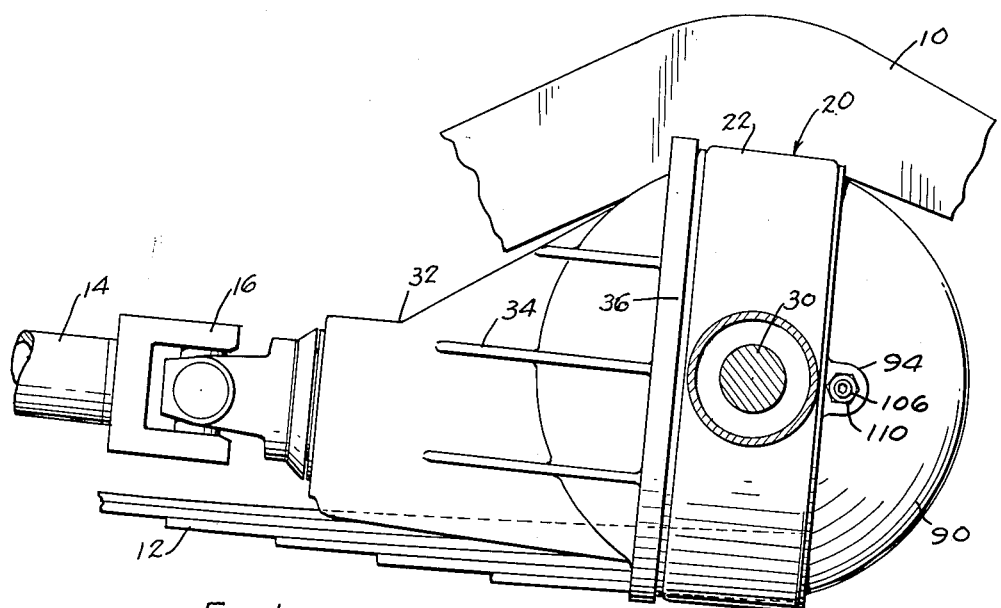
Figure 1 is a side view of an automotive differential embodying the present invention.

Figures 4 and 5 are fragmentary views taken along lines 4—4 and 5—5 of Figure 3.

In the drawings, a differential embodying the presently improved design is shown applied to an automotive type vehicle having a chassis frame which incorporates an upkicked frame side rail portion 10, one at each side of the vehicle, a longitudinal rear leaf spring 12 disposed at each side and connected front and rear to the side rail 10 at that side, a centrally disposed longitudinally extending engine driven propeller shaft 14, and a two-part universal joint 16 for coupling the rear end of the shaft 14 to an input pinion shaft for driving a rear axle on the vehicle. The rear axle includes a generally elongated banjo-type housing 20 so called by reason of the appearance given thereto by its centrally flattened, generally hollow midportion 22 having coaxial side openings formed therein, one at the front as at 24 and one at the rear as at 26. The central portion 22 of the housing has a set of registering flanges spaced apart with respect to one another and defining the respective openings 24, 26.

A pair of right and left rear axles 28, 30 extend individually in opposite directions from the vicinity of the openings 24, 26 and are journalled in bearings provided at the opposite outer ends of the axle housing 20 for anti-frictionally driving a set of rear wheels, not shown. The inner ends of the axles 28, 30 are splined in conventional fashion. A differential carrier 32 received in the banjo portion 22, has a set of integral re-enforcing ribs 34 externally thereof at each side and has an attaching flange 36 adjacent its base. The attaching flange 36 is secured to the adjacent banjo flange of the housing 20 by means of a plurality 40 of bolts, ordinarily nine in number, and clamps a metal-backed sealing gasket 38 therebetween. The carrier 32 has a reduced forward end which internally receives a span of tapered roller bearings 42 having inner races which are axially spaced apart by means of a thin walled tubular collapsible spacer 44. A pinion shaft 46 integrally incorporating a hypoid type drive pinion 48 at one end is journalled for rotation in the inner races of the span of bearings 42 and has a splined opposite end 50 to which one of the parts of the universal joint 16 is firmly non-rotatably connected.

The drive pinion shaft 46 has a central axis of rotation 52 in the carrier 32 which is, as best seen in Figure 3, laterally offset from a central transverse axis indicated at 54 for the rear axle housing 20. The carrier 32, however, incorporates a pair of spaced apart capped bearing pedestals 56, 58 which happen to be equi-distant from the central transverse axis 54. The bearing pedestals 56, 58 are identical to one another in essentials and in the interests of brevity, only the pedestal 56 and its bearing will be particularly described hereinafter. The pedestal 56 incorporates a bearing cap 60 which at its base portions engages the solid body of the pedestal and which arches convergingly outwardly from its base portions to a thickened pin receiving boss 62 disposed centrally of the cap. A plurality of screw fasteners 64, preferably two in number, is provided for bolting the cap 60 to the body of the pedestal 56. The interior surface of the open-centered pedestal has a serially arranged smooth portion and threaded portion for receiving an externally threaded bearing adjuster cap 66, the cap 66 being thus threadably adjustable therein and provided with a plurality of circumferentially spaced openings 68 for receiving a locking cotter pin 70 which passes through an aperture in the thickened pin receiving boss 62 to prevent relative rotation of the adjuster 66 in its threads when finally installed.

Figure 2:
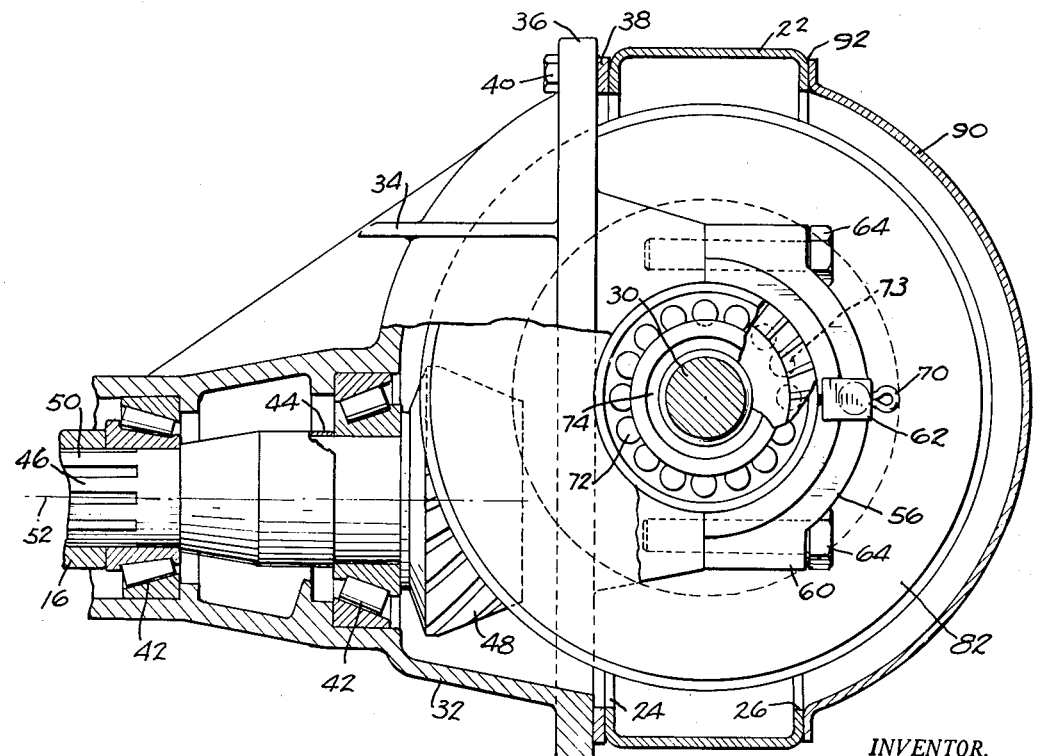
Figure 2 is an enlarged fragmentary view similar to Figure 1 but showing some of the parts broken away for the sake of clarity.

A single row set of tapered roller bearings 72 is held by the adjuster 66 within the smooth portion of the open centered bearing pedestal 56 and rotatably receives one of a pair of oppositely extending reduced tubular hubs 74 formed on a generally hollow differential case 76. The reduced tubular hub 74, Figure 2, on the differential case 76 is internally counter-bored to receive a thin thrust bearing, not shown, and a differential side pinion 78 which thrusts thereagainst through an intermediary of the noted thin thrust bearing. A similar oppositely arranged side pinion 80 is likewise rotatably carried by the differential case 22 for independent rotation and each of the differential side pinions 78, 80 is internally splined to receive the already discussed splined inner ends of the respective axles 30, 28.

The differential case 76 has a hypoid gear 82 secured thereto by a plurality of bolts, not shown, but preferably twelve in number, and disposed in a plane in spaced apart relationship with respect to the transverse axis 54 of the rear axle housing and accordingly defining a general plane with respect to which the near bearing pedestal 56 is relatively adjacent and the far bearing pedestal 58 is relatively remote. The drive pinion 48 engages this hypoid ring gear 82 in a skew angular relationship, wherein the axis 52 for the drive pinion shaft 46 is disposed below and normal to the vertical plane of the central axis indicated at 84 in common for the housing 20, the gear 82, and the axles 28, 30.

The differential carrier 22 solidly carries therewith a transversely disposed pin 86 on which a pair of small bevel pinions 88 is coaxially mounted and which mesh with the side pinions 78, 80 respectively, for driving the rear axles. For this purpose of driving the axles, torque is introduced to the differential case 22 through the intermeshing arrangement of the skew arranged hypoid drive pinion 48 and the hypoid ring gear 82. Such hypoid action results in a separating force effective as between the respective teeth of the pinion and gear and this separating force becomes particularly pronounced when the differential is subjected to reverse direction of rotation corresponding to reverse drive of the vehicle in which it is installed, that is to say, rotation such that the hypoid ring gear rotates clockwise in Figure 2. The stress from this separating force induced by the pinion 48 is conducted from the gear 82 to the tapered roller side bearing 72 thereadjacent and thence into the bearing pedestal 56 of which the cap 60 will be noted to protrude slightly rearwardly through the rear opening 26 in the axle housing 20.

A sheet metal cover 90 formed of pressed steel has a flanged base welded or otherwise secured as at a joint 92 to the rear banjo flange on the axle housing 20, and side walls which converge towards one another to form a general dome shape. The cover 90 has a pair of diametrically opposed flats 94, 96 incorporated in the side walls thereof at locations to the outside of the bearing pedestals 56, 58 and in substantial alignment with the thickened cotter pin receiving bosses 62 thereon. The near flat 94 is provided with an opening 98 through which the sheet-metal-like reduced end of a tubular nut 100 is inserted from the inside and then peened or spun over as at 102 to form a secure joint with the cover 90. An additional means of securement in the form of a weld as at 104, may also be provided between the flat 94 and its associated nut 100. Through the opening 98 and in threaded engagement with the nut 100, a threaded reaction member or bolt 106 is passed and drawn up into predetermined prestressed engagement with the outside face of the thickened boss 62. The external end of the reaction member 106 contains a shallow six sided socket 108 for receiving the end of a conventional adjusting tool or commercial bar wrench. An elastic type lock nut 110 having a plastic locking insert 112 is threaded over the reaction member 106 and is brought up into tight engagement with the margin of the opening in the flat 94 so as to prevent turning movement of the reaction member 106 after final adjustment.

It is to be noted that the threaded reaction member or bolt 106 engages the capped portion of the bearing pedestal 56 at its outermost extremity with respect to the imaginary moment arm measured from the axis 84 for the rear axles. In one physically constructed embodiment of the invention, the lock nut 110 was a plastic insert type and was tightened into locked position by a torque of 35–45 foot-lbs. after an initial preload on the bolt 106 was set at from 15–25 pounds of direct axial thrust corresponding to from 25 to 35 inch pounds of torque. The threads on the bolt 106 were commercial threads.

If desired, the opposite flat 96 on the substantially dome shaped cover 90 may be similarly provided with an internal nut which is spun over and welded thereto and also with a similar threaded plastic insert type reaction member 106 which engages a thickened lug 62 provided on the bearing cap for the companion pedestal 58.

Operation of the above-described differentially acting rear axle described in terms of the inter-action between the hypoid pinion and gear 48, 82, the small pinions 88 and the side pinions 80, and the side bearings 72, 73 and splined axles 28, 30 is fully set forth in the Packard Service Manual, 24th series, 1951, Rear Axle Section 15, Packard Motor Car Company, Detroit 32, Michigan. The phase of the present improvement as represented by the reaction member 106 finds utility as compared with the prior art in that the above-noted inwardly directed separating forces of 8,000 pounds axial thrust are reacted into the welded-on steel cover 90 through the intermediary of the just-noted threaded reaction member 106 which is positionable along its own longitudinal axis so as to be axially adjustable with respect to the housing, axles, and bearings 72, 73, in a direction toward and away from the plane of the bearing pedestal 56 and the hypoid ring gear 82. A preloaded condition is therefore readily made possible, whereby no initial slack or elasticity in a sidewise or lateral direction is permitted to be present in the bearing pedestal 56. The external tool receiving opening 108 in the reaction member 106 permits service and readjustment of the differential assembly as to its preload, even in the field.

As disclosed by the drawings herein, the spaced apart differential bearing pedestals are shown to overhang in a direction so as to protrude outwardly past the rear housing opening 26 and accordingly, the reaction member or members are stationarily supported for axial movement at a point in the side wall of the steel cover 90 adjacent its base. It is evident that in other differential pedestal arrangements, particularly in pedestals of the indirectly supported type having overhang as such in a somewhat different sense and direction, the point for stationary support of the axially adjustable reaction member may be located elsewhere on the cover or even on a different stationary or other component in the differential. So, also, the drawings shows a differential for a solid rear axle drive but self-evidently, certain advantages herein or equally adaptable to solid front axles and also to certain cases of swing type axles, both in front and rear applications in vehicles. The nut 100 is shown to be located inside the cover 90, resulting in transmitting thrusts into the flat of the cover by direct compression without necessarily loading the welds 104, but indeed, it is not essential to the invention that these nuts be inside the cover and for clearance reasons or for some other cause or convenience, the case-carried nut 100 may be outside the case and the threaded reaction member 106 be threaded through the nut and thence into the interior of the dome shaped cover 90.

Variations within the spirit and scope of the invention described are equally comprehended by the foregoing description.

What is claimed is:

1. In combination in a generally elongated rear axle housing having central axially aligned front and rear openings, a pair of spaced apart bearings for rotatably supporting a differential case between said openings, a differential carrier having a structure for receiving each of the bearings and each including a bearing pedestal, a bearing cap bolted thereto, and a bearing adjuster cap threadably received in each bearing pedestal and cap structure, a domed pressed sheet metal cover having a radially disposed base flange for attachment to the margin of the rear axle housing opening and being provided with a flattened wall-portion in the side of the dome in adjacency to at least one of said bearing caps, said one bearing cap having a thickened boss near the mid-point thereof, a nut passed through an opening in a flattened wall portion and being rigid therewith, and a pre-loading stud threadably received in the nut, said thickened boss on the bearing cap having a locking pin passed through and anchored within a transverse aperture therein to engage and restrain movement of the bearing adjuster cap in a pre-adjusted locked position, and having the end surface thereof in direct engagement with the pre-loading stud to restrain deflection of the cap in a stud-determined pre-loaded position of the corresponding bearing.

2. In combination in a generally elongated rear axle housing having central axially aligned front and rear openings, a pair of spaced apart bearings for rotatably supporting a differential case between said openings, a differential carrier having a structure for receiving each of the bearings and each including a bearing pedestal, a bearing cap bolted thereto, and a bearing adjuster cap threadably received in each bearing pedestal and cap structure, a domed cover of pressed sheet metal having a radially disposed base flange for attachment to the margin of the rear opening in the housing outside of the bearing structures, and being provided with diametrically opposed mutually parallel flattened wall portions in the sides of the dome, each in adjacency to the bearing cap at that side, each of the respective bearing caps having a thickened boss near the mid-point thereof, a nut passed through an opening in each of the flattened wall portions and affixed thereto, and pre-loading studs threadably received in the nuts, said thickener cap bosses each having a locking pin passed through and anchored within a transverse aperture therein to engage and restrain movement of the adjacent bearing adjuster cap in a pre-adjusted locked position and having the end surface thereof in direct engagement with the adjacent pre-loading stud to restrain deflection of the cap in a stud-determined pre-loaded position of the corresponding bearing.

References Cited in the file of this patent

UNITED STATES PATENTS

| | | |
|---|---|---|
| 1,268,192 | Weaver | June 4, 1918 |
| 1,569,664 | Mogford | Jan. 12, 1926 |
| 1,828,025 | Church | Oct. 20, 1931 |
| 1,880,655 | Baits | Oct. 4, 1932 |
| 1,987,716 | Skelton | Jan. 15, 1935 |

FOREIGN PATENTS

| | | |
|---|---|---|
| 171,476 | Austria | Nov. 15, 1951 |
| 633,317 | France | Oct. 22, 1927 |